United States Patent Office 3,074,473
Patented Jan. 22, 1963

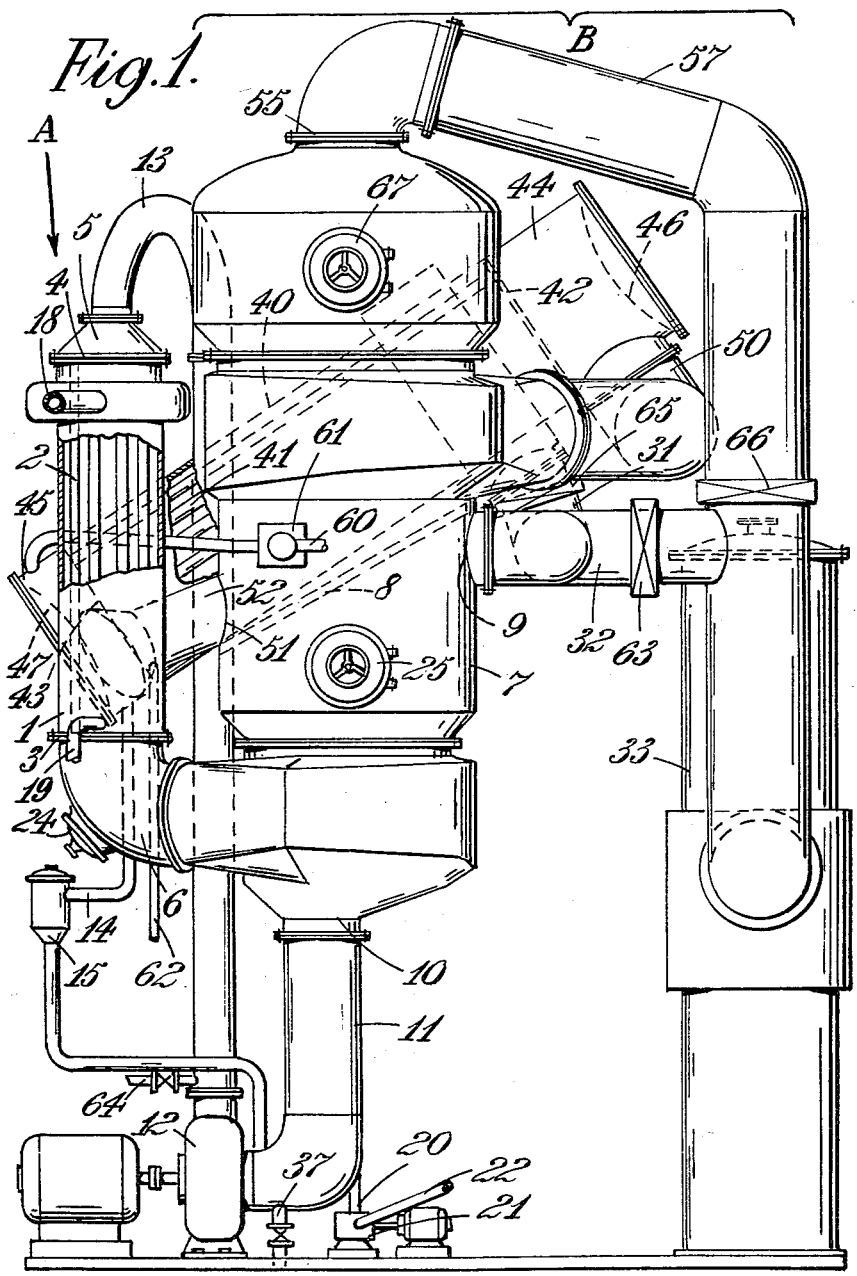

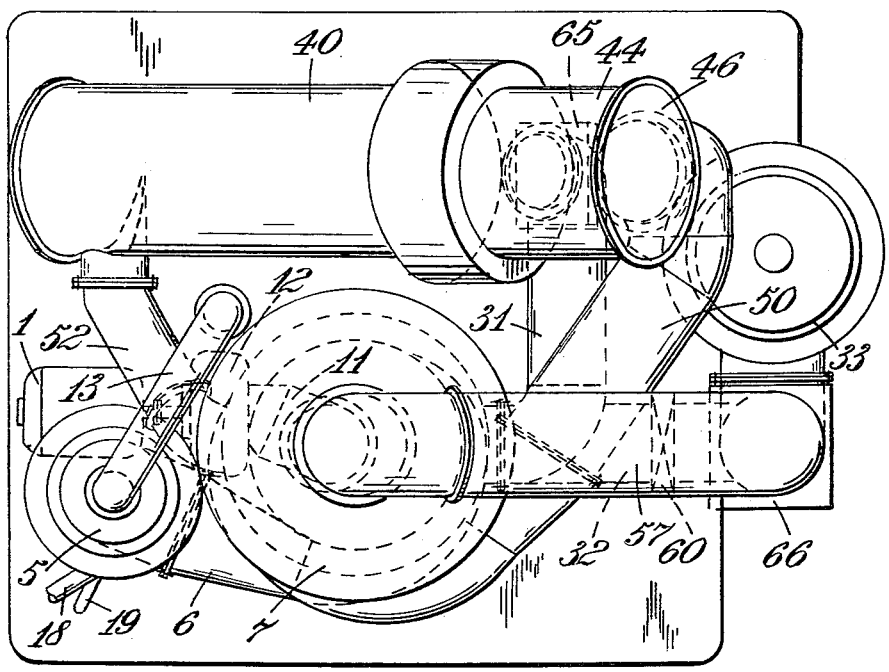

3,074,473
VERTICAL TUBE EVAPORATORS WITH DOWN-
WARD PRESSURE LIQUID FLOW
Viacheslav Jansen Janovtchik, London, England, assignor to H. J. Heinz Company Limited, London, England, a British company
Filed Dec. 15, 1958, Ser. No. 780,279
Claims priority, application Great Britain Dec. 23, 1957
7 Claims. (Cl. 159—2)

The invention relates to evaporators and especially but not exclusively to the concentration to a high degree by evaporation of solutions or liquid mixtures, such as tomato juice, which tend to lose fluidity or to become paste-like with increasing concentration.

Hereafter the term liquid mixture used throughout the specification is intended to include solutions, solids suspended in liquids, or mixtures of liquids of different boiling points.

The invention provides the method of concentrating a liquid mixture by evaporation which comprises introducing the liquid mixture into the upper end of at least one narrow downwardly extending passage at such a rate that it completely fills the bore of the passage and the liquid mixture is forced down the passage, and applying sufficient heat to the liquid mixture as it passes down the passage to cause the liquid mixture to boil, and separating the vapour from the liquid mixture after leaving the passage.

In carrying out the above method the mixture may be returned to the upper end of the passage for re-circulation in order to increase the degree of concentration.

Part of the liquid mixture may be withdrawn (e.g. continuously) before or during re-circulation and additional liquid mixture added (e.g. continuously).

Preferably the heat of the vapour separated from the liquid mixture is employed to effect a preliminary evaporation of such additional liquid mixture.

The invention also provides an evaporating apparatus comprising a number of comparatively narrow upright passages, means for introducing the liquid mixture into the upper ends of said passages at such a rate that it fills them completely and is forced downwardly at a substantially higher velocity than would result, inside the narrow passages, from gravity alone, means for heating said passages so that the liquid mixture boils, a vessel for collecting and separating the resulting mixture of liquid and vapor issuing from the bottom ends of the passages, means for removing the liberated vapor, means for conducting the thus thickened or more concentrated mixture again to the upper ends of said passages, thus forming a closed circuit and means for withdrawing some of the liquid to a delivery outlet.

The aforesaid narrow upright passages may comprise a number of small or medium bore tubes spaced apart.

The means for heating said passages may comprise a shell which encloses said passages and means for passing heated fluid, for example steam, into and out of said shell.

The means for introducing the liquid mixture into the upper ends of said passages may comprise a pump, for example a centrifugal pump, the inlet side of which is connected to a supply for said liquid mixture and the outlet side of which communicates with a header chamber associated with the upper ends of said passages.

Both the bottom of said vessel and a source of supply of additional liquid mixture may communicate with the inlet of the pump while the outlet of the pump communicates with the upper ends of said passages. Means may be provided for maintaining a constant head of liquid mixture above the pump inlet by controlling the supply of additional liquid mixture according to changes in the head.

The inlet or the outlet of the pump may have a delivery outlet for the liquid mixture, valve means being provided for controlling the flow through the delivery outlet.

A second pump may be associated with the delivery outlet.

The means for removing the vapour liberated from the thickened mixture may comprise a condenser connected to the upper end of said vessel. The thickened or more concentrated mixture may pass out of the lower end of said vessel through the pump to the upper ends of said passages. It may also pass to the delivery outlet directly or through the pump. The condenser may be operated under negative pressure.

The lower ends of said upright passages may be connected by a conduit with the lower end of the vessel for collecting the thickened or more concentrated mixture and vapour.

The aforesaid conduit may extend downwardly from the lower end of the upright passages, in a curved manner and may enter the lower end of said vessel substantially horizontally, and, it may be, tangentially in order to assist in separation of the liquid from the vapour.

The aforesaid upright passages and shell which encloses them may be formed as a detachable unit.

The supply of mixture to the upper ends of said upright passages may be derived from a preliminary evaporator which may be of conventional form and preferably delivers to the inlet of the pump. The preliminary evaporator may be a part of a combination of evaporators of conventional form.

The heating medium for said preliminary evaporator may comprise the vapour separated from the liquid mixture by the first said evaporator.

Fresh liquid mixture may be supplied to the preliminary evaporator from an outside source and may be circulated in the closed circuit through the heat exchanger of said preliminary evaporator and be tapped off from a part of said circuit and conducted (e.g. through a supply and level regulator device) to the closed circuit of the first said evaporator.

The said preliminary evaporator may form the condenser for the vapour liberated from the liquid mixture of the first said evaporator and be provided with an outlet for the condensate.

The said preliminary evaporator may comprise a number of inclined tubes enclosed within an inclined shell, the upper and lower ends of which tubes communicate respectively with upper and lower chambers. The upper chamber may be connected (preferably tangentially) to one position in a second collecting and separating vessel and the lower chamber may be connected to said second vessel at another position, which is at or adjacent the bottom of the vessel. The second collecting and separating vessel may be positioned on top of the collecting and separating vessel of the first said evaporator. The second collecting and separating vessel may also have an outlet for vapour at or near the top of the vessel, which outlet may be connected to a vacuum condenser.

The second collecting and separating vessel may be provided with a supply and regulator device for the fresh liquid mixture whereby the liquid mixture assumes a level therein which brings it to the required height along the inclined pipes.

The following is a more detailed description of an evaporating apparatus suitable for treating aqueous liquid mixtures such as tomato-juice and embodying two interconnected closed circuit evaporators one of which is of a known form and the other embodies novel features provided by the present invention reference being made to the accompanying drawings in which:

FIGURE 1 is an elevation of the apparatus, partly diagrammatic and partly broken away, and FIGURE 2 is a plan view of the apparatus.

The evaporator to the left of the drawing and designated by the letter A comprises a cylindrical vertical shell 1. Inside this shell there is a nest of tubes 2 (only four of which are shown in the figure). The ends of the tubes engage holes in two plates 3 and 4 near each end of the shell. Above the upper plate 4 there is a header chamber 5. Both the shell and chamber are provided with flanges between which the plate 4 is clamped.

The lower part of the shell 1 is connected through a curved conduit 6 to an elongated opening in the lower part 7 of a cylindrical separating vessel so that a horizontal portion of the conduit meets the vessel substantially tangentially. Both the lower end of the shell and the conduit 6 are provided with flanges between which the plate 3 is clamped.

The chamber 7 is divided, by a partition indicated at 8, into upper and lower portions and has two manholes with hinged doors 25 and 67. The lower portion is provided, near its upper end, with an opening 9 while the lower end has an opening 10 which, in this example, is offset from the centre of the vessel and is connected by a conduit 11 to the inlet of a pump 12 which, in this example, is of the centrifugal type.

The outlet of the pump 12 communicates through a pipe 13 with the header chamber 5 of the shell 1 so as to form a closed circuit.

The evaporator A is supplied with liquid mixture through a pipe 14 from another evaporator later described, the level of the liquid in the lower part of chamber 7 being controlled by a float device 15 to give the necessary head to the pump 12.

The liquid mixture for example tomato-juice is delivered by the pump 12 and the pipe 13 to the top of the shell 1, fills completely the header chamber 5 above the plate 4 as well as the bores of the tubes 2 and is forced down through the tubes 2 which it leaves as high velocity jets.

The liquid passes into the curved pipe 6 and tangentially into the lower part of the separating vessel 7. It falls by gravity through the conduit 11 back to the pump 12 to re-commence the circuit.

The vertical shell 1 is provided with an inlet 18 at an appropriate distance below the plate 4 and with an outlet pipe 19 at a position near the plate 3 for a stream of hot gases, steam or hot liquid which flows between the tubes 2 inside the shell.

The heat supplied through the tubes to the aqueous liquid mixture flowing downwards in the form of high velocity jets, heats it up and brings it very quickly to boiling point and evaporation of the water content thus takes place.

The mixture of water vapour and the thickened or more concentrated aqueous mixture flows down the tubes 2 and through the conduit 6 into the lower part of the separating vessel 7 where water-vapour separates from the mixture and passes upwardly through the upper opening 9, while the thickened or more concentrated mixture falls down through the opening 10 to the pump 12 to be taken up to the top of the tubes 2 again for further heating and evaporation of the remaining water.

After a number of circuits as described above the mixture reaches the required degree of density and it is continuously withdrawn from the evaporator through an outlet 20 leading to a discharge device 21 which may comprise another pump with an outlet 22 to storage.

The feeding of the initial comparatively thin mixture and the extraction of the concentrated product is regulated by adjusting the feeding-in device 15 and the discharge device 21 in such a manner as to assure a continuous in and out flow of the material and therefore a continuous operation of the evaporator.

When it is judged that the operation of the evaporator should be stopped, it can be completely emptied of all the material inside through an opening 37 and a valve, situated at the lowest point of the evaporator.

A hinged door cover 24 is provided in the outer end of the conduit 6 which may be opened to afford access to the interior of the said conduit, and access to the lower end of the separator can be gained by opening the cover 25. The evaporator unit and the headers may be removed by unclamping the top and bottom where the flanged connections are provided.

The evaporator, like conventional evaporators, is operated under negative pressure for which purpose, if the evaporator as described above is acting alone to concentrate the aqueous liquid mixture it is directly connected through the upper opening 9 of the separating vessel 7 through a pipe 32 to a vacuum producing equipment such as a water-cooled condenser 33. Control valves 65, 66, are closed and valve 63 is open.

As shown in the drawing however the evaporator is associated with a preliminary evaporator to provide a double-effect backward feed combination. The preliminary evaporator is more conventional in design and forms a condenser for the water vapour extracted from the aqueous liquid mixture by the first evaporator.

The constructional form of said preliminary evaporator designated by B is of a known design usually referred to as an "inclined shell" evaporator and was chosen by way of example for combination with the evaporator described above. This combination however provides advantageous conditions for the concentration of liquids, but naturally other types of evaporators or combination of evaporators like double effect types can be used for combination with the evaporator first described.

The upper opening 9 of the lower part of the separating vessel 7 is connected by the pipe 31 and valve 65 to the inclined shell 40 of said preliminary evaporator.

This inclined shell 40 contains a nest of tubes 41, of which only four are shown in the drawing fitted at each end respectively into holes in two plates 42 and 43 and which are fixed to flanges on the shell to form a closed compartment between them.

The shell has secured to its end chambers 44 and 45 hinged covers 46 and 47 fixed with clamps.

The upper chamber 44 communicates through a pipe 50 with the upper part of separating vessel 7 which is of circular cross-section of large diameter and so that the pipe 50 meets the vessel substantially tangentially at a distance above the bottom of the upper part of the separating vessel.

This part of the separating vessel has a bottom opening 51 which is connected by a pipe 52 to the lower chamber 45 of the shell 40 thus providing a closed circuit.

The upper part of the separating vessel 7 is provided at its upper end with an opening 55 which is connected by a pipe 57 with a vacuum-producing water-cooled condenser 33.

A feed pipe 60 for fresh liquid mixture enters the lower chamber 45 and the flow of the mixture is controlled by a valve 61 according to the level of liquid in the upper part of vessel 7 as determined by a float therein operating the valve 61.

The aqueous mixture to be evaporated passes by gravity through the opening 51 and down the pipe 52 to the bottom chamber 45 below the plate 43 of the inclined shell and fills the tubes 41 up to the same level as the mixture assumes in the upper part of the separating vessel 7.

Water vapour from the first evaporator A which is separated in the lower part of the separating vessel 7, escapes through the upper opening 9 and the pipe 31 and valve 65 and comes in contact with the tubes 41 inside the inclined shell 40 of the preliminary evaporator B. In this case the valve 63 is closed and the valve 66 is opened.

Vapour condenses on these tubes and gives up heat which is absorbed by the aqueous mixture inside these tubes.

The mixture is therefore heated up and begins to boil.

Water vapour is formed and pushes the mixture up the tubes.

The more concentrated mixture and vapour escapes from the tubes into the upper part of the separating vessel 7 where vapour separates and passes out through the opening 55 and pipe 57 to the condenser 33, where it is condensed by water.

The more concentrated mixture in entering the upper part of the separating vessel 7 brings up the level of the mixture inside this separating vessel and consequently causes the contents of the upper part of the separating vessel to move downwardly along the pipe 52 to the bottom of the inclined shell 40.

From here the aqueous mixture is again pushed up the tubes 41 by bubbles of vapour formed inside the tubes 41 by the heat supplied by the vapour coming from the unit A and quickly enters in continuous thermal circulation via tubes 41 separating vessel 7 and the pipes 50, 52. A proportion of the circulating mixture in the evaporator B flows by gravity through the pipe 14 and the level regulator device 15 into evaporator A and enters the inlet side of the pump 12. If necessary (e.g. if the two evaporators A and B are at the same level) the pipe 14 may embody a transfer pump.

According to the constructional form of the invention the numbers of tubes 2 and 41 transmitting the heat in each of the evaporators A and B are so proportioned (e.g. in the area ratio of one to four) that the vapour produced in the unit A condenses completely on the tubes 41 of the unit B and is withdrawn from a pipe 62. This re-use of the vapour from unit A forms a double-effect evaporation.

The vapour produced in the evaporator B flows into the vacuum condenser 33 the capacity of which is calculated to absorb it entirely and to maintain the necessary negative pressure inside the evaporator B and corresponding negative pressure inside the evaporator A. Pumps for removal of uncondensable gases are provided.

Owing to this constructional arrangement of the invention the amount of vapour produced in each unit is automatically controlled and the aqueous mixture is concentrated at the temperatures corresponding to the relative areas of the surface of tubes in two heating shells and the negative pressure obtainable by the water condenser.

When the concentration of the aqueous mixture reaches the desired value, the extraction device 21 is brought into action and the concentrated mixture can be withdrawn in a continuous manner and at a predetermined rate. The fresh aqueous mixture is admitted through the pipe 60 and float level control device 61 in a quantity proportional to the amount of the extraction so as to keep the levels of the aqueous mixtures inside the two units at a required height. The concentration of the aqueous mixture can be thus carried out continuously for long periods without interruption.

The degree of concentration obtainable in the constructional forms of the invention is easily regulated and can reach over 40% solids in the case of tomato juice. A higher degree of concentration may be obtained for some other liquids.

It is found in practice that in evaporating tomato-juice a suitable size for the bores of the upright tubes 2 is about from one to one and a half inches and the rate of delivery of the tomato-juice should be such as to produce a downward inlet velocity through the tubes of about 4 to 5 feet per second. The length of the tubes may be about 8 to 10 feet. The range of temperatures in the first and second effects may be, respectively, 140° F.–160° F. for evaporator A and 90° F.–110° F. for evaporator B, with corresponding vapour pressures. The boiler steam pressure at inlet 18 may be about 1 to 10 lbs./sq. ins.

It will be appreciated that various modifications may be made to the details of construction shown in the drawings without departing from the scope of the invention. For example instead of the pipe 13 leading from the pump 12 to the header chamber 5 being disposed between the separating vessel 7 and the shell 1, both the pipe and the pump might be disposed on that side of the shell 1 remote from the separating vesel 7. In this latter arrangement two pumps 12 and delivery pipes 13 might be provided, both of which latter being connected to the upper chamber 5. Instead of the pump or pumps being disposed to one side of the vessel 7 it or they may be disposed beneath the vessel while shell 1 extends upwardly from separating vessel 7. Further, instead of the outlet 20 being on the inlet side of pump 12 it may be on the outlet side (e.g. at the lower end of pipe 13 as shown at 64). In addition, the two separator vessels may be constructed as two independent vessels at the same level instead of two superposed parts of the same vessel. In this case the conduit 6 might be connected directly into the top of the separating vessel of the evaporator A.

The evaporator B may be composed of two similar inclined shell evaporators combined between themselves in double-effect, of which the first effect receives the vapour from evaporator A to form a triple effect backward feed evaporation system. The two inclined shells may be positioned one above the other and be associated, as above described, with collecting and separating vessels which are likewise one above the other.

I claim:

1. The method of concentrating a liquid mixture which comprises continuously recycling the liquid from a receiver under pressure through a plurality of small diameter tubes into a separating environment maintained at sub-atmospheric pressure in which the tubes terminate with the flow of liquid being at a rate and pressure sufficient to solidly fill the tubes at their upper ends and increase the velocity of flow above the velocity resulting from gravity, circulating heating fluid about the tubes to raise the temperature of the liquid in the lower positions of the tubes before discharge thereof from the tubes to its boiling point whereby vapor pressure accelerates the discharge of liquid from the tubes and upward pressure is opposed by the solid columns of liquid under pressure in the upper portions of the tubes, separately withdrawing vapor and liquid from the separating environment and returning the liquid to the receiver under pressure from which it is again forced through the tubes, continuously supplying fresh liquid to be processed to the liquid being recycled to maintain the volume of flow substantially constant, and continuously withdrawing some of the liquid at a predetermined rate from the volume of liquid being recycled and at a rate slower than the rate of supply of fresh liquid, and utilizing the vapor separated from the liquid to preheat the incoming liquid.

2. Apparatus for concentrating liquids by evaporation comprising an evaporator unit having an elevated confined liquid receiving chamber, a plurality of relatively small diameter vertical tubes of the order of 1 to 1½ inches in diameter into which liquid flows from the receiving chamber, an enclosed steam chamber through which the tubes extend for heating liquid flowing through the tubes, a conduit through which liquid is supplied to the receiving chamber at a rate sufficient to maintain the liquid under pressure in the receiving chamber and force the liquid under pressure through the tubes, a pump for pumping liquid from a level below the evaporator through said conduit, a duct of substantially larger capacity than the said conduit into which the lower ends of the tubes open, a separator into which the duct leads, the separator having a lower portion into which liquid flows from the duct by gravity, a second conduit leading from said lower portion of the separator to the inlet of the pump of a capacity to supply a reserve fluid in the lower part of the separator beyond the capacity of the pump, means for withdrawing vapor from the separator, means for supplying liquid to the evaporator at a rate sufficient to maintain a substantially constant level of liquid in the lower portion of the separator, and means for withdrawing liquid at a predetermined rate from the apparatus between the separator and the elevated receiving chamber.

3. A continuous evaporator comprising an evaporator unit comprising an upper liquid receiving chamber having a header plate forming the bottom thereof, a plurality of small diameter vertical tubes having their upper ends secured to the header plate and opening into the chamber, the full diameter of the tubes being unobstructed throughout their full length, a lower header plate at the bottom ends of the tubes, a duct of larger capacity than the combined capacity of all of the tubes below the lower header plate and for which the lower header plate constitutes the entering end, an enclosure about the tubes between the two header plates forming a steam chest, a separator into which the duct opens with means for collecting and retaining liquid at the bottom thereof and having a vapor offtake space above the liquid level, the duct opening into said space at least partly above the liquid level whereby liquid and vapor may flow through the duct into the separator unobstructed by the liquid in the separator, a pump below the separator for withdrawing liquid therefrom, a conduit for carrying liquid from the pump to the receiving chamber, the pump and conduit having a capacity adequate to keep the liquid in the receiving chamber under pressure and the upper ends of the vertical tubes full of liquid during operation of the evaporator and accelerate the rate of flow of the liquid through the tubes above that resulting from gravity, means for supplying liquid to be evaporated to the apparatus at a rate to keep a substantially constant level of liquid in the bottom of the separator, means for withdrawing liquid from the apparatus at a rate less than the rate of supply of liquid to the apparatus, and means for withdrawing vapor from the separating space and maintaining a reduced pressure in the separator and duct whereby the gravity flow of liquid through the vertical tubes is unimpeded in the ducts and separator.

4. A continuous evaporator comprising an evaporator unit comprising an upper liquid receiving chamber having a header plate forming the bottom thereof, a plurality of small diameter vertical tubes having their upper ends secured to the header plate and opening into the chamber, the full diameter of the tubes being unobstructed throughout their full length, a lower header plate at the bottom ends of the tubes, a duct of larger capacity than the combined capacity of all of the tubes below the lower header plate and for which the lower header plate constitutes the entering end, an enclosure about the tubes between the two header plates forming a steam chest, a separator into which the duct opens with means for collecting and retaining liquid at the bottom thereof and having a vapor offtake space above the liquid level, the duct opening into said space at least partly above the liquid level whereby liquid and vapor may flow through the duct into the separator unobstructed by the liquid in the separator, a pump below the separator for withdrawing liquid therefrom, a conduit for carrying liquid from the pump to the receiving chamber, the pump and conduit having a capacity adequate to keep a forced flow of liquid into the tubes at a velocity in excess of the gravity induced flow during operation of the evaporator, means for supplying liquid to be evaporated to the separator, means for withdrawing liquid from the apparatus at a rate less than the rate of supply of liquid to the apparatus, and means for withdrawing vapor from the separating space and maintaining a reduced pressure in the separator and duct whereby the flow of liquid through the vertical tubes is unimpeded in the ducts and separator, the evaporator and the separator having vertical parallel axes and being located side by side, said duct into which the tubes open being horizontal with an upwardly-turned end on which the lower header plate is mounted, the separator being a cyclone type separator with the duct opening tangentially into the separator to induce a swirling motion to the incoming vapors and liquid.

5. A continuous evaporator comprising an evaporator unit comprising an upper liquid receiving chamber having a header plate forming the bottom thereof, a plurality of small diameter vertical tubes having their upper ends secured to the header plate and opening into the chamber, the full diameter of the tubes being unobstructed throughout their full length, a lower header plate at the bottom ends of the tubes, a duct of larger capacity than the combined capacity of all of the tubes below the lower header plate and for which the lower header plate constitutes the entering end, an enclosure about the tubes between the two header plates forming a steam chest, a separator into which the duct opens with means for collecting and retaining liquid at the bottom thereof and having a vapor offtake space above the liquid level, the duct opening into said space at least partly above the liquid level whereby liquid and vapor may flow through the duct into the separator unobstructed by the liquid in the separator, a pump below the separator for withdrawing liquid therefrom, a conduit for carrying liquid from the pump to the receiving chamber, the pump and conduit having a capacity adequate to keep the liquid in the receiving chamber and the upper portions of the vertical tubes full of liquid under pressure during operation of the evaporator, means for supplying liquid to be evaporated to the apparatus at a rate to keep a substantially constant level of liquid in the bottom of the separator, means for withdrawing liquid from the apparatus at a rate less than the rate of supply of liquid to the apparatus, means for withdrawing vapor from the separating space and maintaining it at reduced pressure in the separator and duct whereby the gravity flow of liquid through the vertical tubes is unimpeded in the duct and separator, the vapor offtake space of the separator being defined by a cylindrical shell, an inclined partition across the shell below the top of the shell, said means for withdrawing vapor from the separator comprising a conduit leading from the space in the separator below said partition, a preliminary evaporator positioned to one side of the cylindrical shell and having its longitudinal axis inclined with respect to the vertical axis of the shell, the preliminary evaporator comprising a plurality of tubes opening into a common chamber at each end of the evaporator, an enclosure around the tubes between the end chambers forming a steam chest, said conduit from the separator opening into said enclosure whereby the vapor from the separator may heat liquid in the preliminary evaporator and the preliminary evaporator condenses said vapors to maintain a reduced pressure in the separator, a duct leading from the chamber at the upper end of the preliminary evaporator tangentially into the upper part of the cylindrical shell above the inclined partition, a cover at the top of said shell having a vapor outlet duct in the central portion thereof, a duct leading from the interior of the shell at the level above the lower edge of the said partition through which liquid is returned from the space above the partition to the chamber at the lower end of the preliminary evaporator, the lower end of the preliminary evaporator being below the lower edge of the inclined partition and the upper end thereof being at a level above the upper edge of the inclined partition, the space within the shell above the inclined partition constituting a second cyclone separator, said means for supplying liquid to the first above-mentioned evaporator including a pipe connected with the lower portion of the preliminary separator, and means for supplying original liquid to the preliminary evaporator.

6. The method of concentrating a liquid mixture which comprises supplying the liquid mixture to a confined elevated receiving chamber and discharging it downwardly through a plurality of relatively small tubes, the liquid being supplied to the receiving chamber at a rate and under pressure sufficient that the liquid moves through the tubes with a force and at a velocity in excess of that resulting from gravity alone and keep the upper ends of the tubes solidly full of liquid and exert a downward force on the column of liquid in each tube, applying heat to the exterior of the tubes sufficient to heat the liquid approaching the lower ends of the tubes to boiling temperature, discharging liquid and vapor from the lower ends of the tubes into an expansion chamber, the upward force of the expansion of the boiling mixture being blocked by the descending solid column of liquid under pressure in the upper portions of the tubes, separating the vapor and the liquid in said expansion chamber, withdrawing the vapor and condensing it to maintain a subatmospheric pressure in the expansion chamber, recycling some of the liquid under pressure to the receiving chamber, removing some of the liquid as finished product before it is returned to the receiving chamber, and supplying make-up liquid mixture to the liquid being recycled.

7. The method of concentrating a liquid mixture which comprises supplying the liquid mixture to a confined elevated receiving chamber and discharging it downwardly through a plurality of relatively small tubes and of the order of 1 to 1¼ inches in diameter, the liquid being supplied to the receiving chamber at a rate and under pressure sufficient that the liquid moves through the tubes with a force and at a velocity in excess of that resulting from gravity alone and of the order of 4 to 5 feet per second and thereby keep the upper ends of the tubes solidly full of liquid and exert a downward force on the column of liquid in each tube, applying heat to the exterior of the tubes sufficient to heat the liquid approaching the lower ends of the tubes to boiling temperature, discharging liquid and vapor from the lower ends of the tubes into an expansion chamber, the upward force of the expansion of the boiling mixture being blocked by the descending solid column of liquid under pressure in the upper portions of the tubes, separating the vapor and the liquid in said expansion chamber, withdrawing the vapor and condensing it to maintain a subatmospheric pressure in the expansion chamber, recycling some of the liquid under pressure to the receiving chamber, removing some of the liquid as finished product before it is returned to the receiving chamber, and supplying make-up liquid mixture to the liquid being recycled.

References Cited in the file of this patent
UNITED STATES PATENTS

| | | |
|---|---|---|
| 378,943 | Lillie | Feb. 28, 1888 |
| 1,331,373 | Prache | Feb. 17, 1920 |
| 2,076,597 | Robinson et al. | Apr. 13, 1937 |
| 2,570,211 | Cross | Oct. 9, 1951 |
| 2,651,356 | Sadtler | Sept. 8, 1953 |
| 2,703,610 | Cross | Mar. 8, 1955 |
| 2,734,565 | Lockman | Feb. 14, 1956 |
| 2,745,484 | Eckstrom | May 15, 1956 |
| 2,777,514 | Eckstrom | Jan. 15, 1957 |
| 2,914,120 | Hunt et al. | Nov. 24, 1959 |

FOREIGN PATENTS

| | | |
|---|---|---|
| 743,914 | France | Apr. 8, 1933 |